(No Model.)
H. T. CUSHMAN.
ART OF PREPARING VULCANIZED RUBBER FOR ERASIVE PURPOSES.
No. 254,622. Patented Mar. 7, 1882.
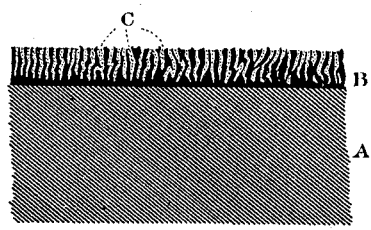
WITNESSES.
L. C. Partridge
J. H. Wardell
INVENTOR.
Henry T. Cushman
by Franklin Scott, Attorney.

UNITED STATES PATENT OFFICE.

HENRY T. CUSHMAN, OF NORTH BENNINGTON, VERMONT.

ART OF PREPARING VULCANIZED RUBBER FOR ERASIVE PURPOSES.

SPECIFICATION forming part of Letters Patent No. 254,622, dated March 7, 1882.

Application filed January 27, 1882. (No model.)

*To all whom it may concern:*

Be it known that I, HENRY T. CUSHMAN, of the village of North Bennington, in the county of Bennington and State of Vermont, have invented certain Improvements in the Art of Preparing Vulcanized Rubber for Erasive Purposes, and in articles designed for erasive uses manufactured therefrom, of which the following description, in connection with the accompanying drawing, constitutes a specification.

It is well known that many processes of vulcanizing india-rubber leave the finished product with a case-hardened or toughened external skin, which is almost entirely destitute of erasive qualities when used to remove lead-pencil marks from paper. To qualify such rubber for successful use in erasing lead-pencil marks it is customary to cut away or grind off such toughened layer, so as to expose the softer and more naturally elastic rubber beneath. Such excision or detrition of the external material involves trouble and annoyance to the user, and a very substantial loss of material.

The object of this invention is to utilize this toughened vulcanized skin by so treating and manipulating it as to render it erasive.

The accompanying drawing elucidates the fundamental idea of this invention, and shows, on a grossly exaggerated scale, the condition of a section of ordinary stationer's rubber lead-eraser after having been treated by my mechanical process to render its outer or otherwise non-erasive skin capable of effectually erasing lead or graphite marks from paper or other substances.

That part of the section marked A indicated by the cross-hatched lines represents the heart or interior portion of a common block of erasive rubber which is unaffected by the treatment under consideration.

The jagged, abraded, or serrated portion, colored black, (marked B,) represents that portion of the block hardened or toughened by the vulcanizing process, and usually non-erasive in character.

The dots in the interstices marked C represent particles of fine pulverized sulphur or other material capable of abrading the skin of the rubber.

It is well known that pulverulent sulphur used in connection with india-rubber upon surfaces carrying lead-pencil marks facilitates their erasure.

My invention resolves itself into two inseparable divisions—viz., the process whereby such non-erasive surfaces are rendered available for erasive purposes, and the product so obtained.

The process consists, first, in submitting vulcanized rubber having such hardened or toughened non-erasive skin to any mechanical action whereby such skin is scarified or abraded to the extent of capacity to hold in such abrasions or fissures pulverulent sulphur by mechanical or frictional contact; and, second, in embedding in the abrasions, fissures, or serrations so produced sulphur in pulverulent form. The two steps of this process may be carried out succesively, as here indicated, or simultaneously, the result being the same in either case, the order of procedure being immaterial. The article produced is an erasing block or tablet made from india-rubber, with an otherwise non-erasive external surface or skin resulting from vulcanization, rendered entirely available for erasing purposes by having such skin scarified or abraded to a depth sufficient to receive and retain powdered sulphur, or substantially analogous material, and having embedded or ingrained in such abrasions or scarifications pulverulent sulphur, or substantially equivalent material, by means of which such abraded skin is rendered available for erasive purposes.

In the foregoing description I have mentioned sulphur as a proper powdered material with which to fill the scarifications or abrasions in the skin of the erasive tablet; but many other substances are available to accomplish the same result more or less effectually. Powdered resin and the article commonly known as "pounce" are well adapted for such use, and in fact any material which when finely powdered or granulated still retains a sharp grit will accomplish the purpose, as the *modus operandi* of the invention consists in the sharp particles of the powder abrading or cutting the serrated or jagged surfaces of the rubber by reason of the attrition set up between the two, resulting from the motion of the tablet and the pressure exerted upon it under the fingers in ordinary use. Hence I do not restrict myself to the use of sulphur alone for the purposes named; but I do claim—

1. The herein-described process of rendering vulcanized erasive rubber available for use without removing the external hardened coating or skin resultant from the vulcanizing process, consisting of scarification or abrasion of such skin and the filling of such abrasions or scarifications with a powdered material capable of effecting further abrasion of the rubber by attrition when used substantially as specified.

2. As a new article of stationery, a rubber erasive tablet having its toughened external vulcanized surface scarified or abraded, and such abrasions filled with a powdered material capable of effecting the purposes described in the manner set forth.

In testimony whereof I have hereto subscribed my name, at North Bennington, Vermont, this 24th day of January, A. D. 1882.

HENRY T. CUSHMAN.

In presence of—
FRANKLIN SCOTT,
L. C. PARTRIDGE.